Patented May 2, 1944

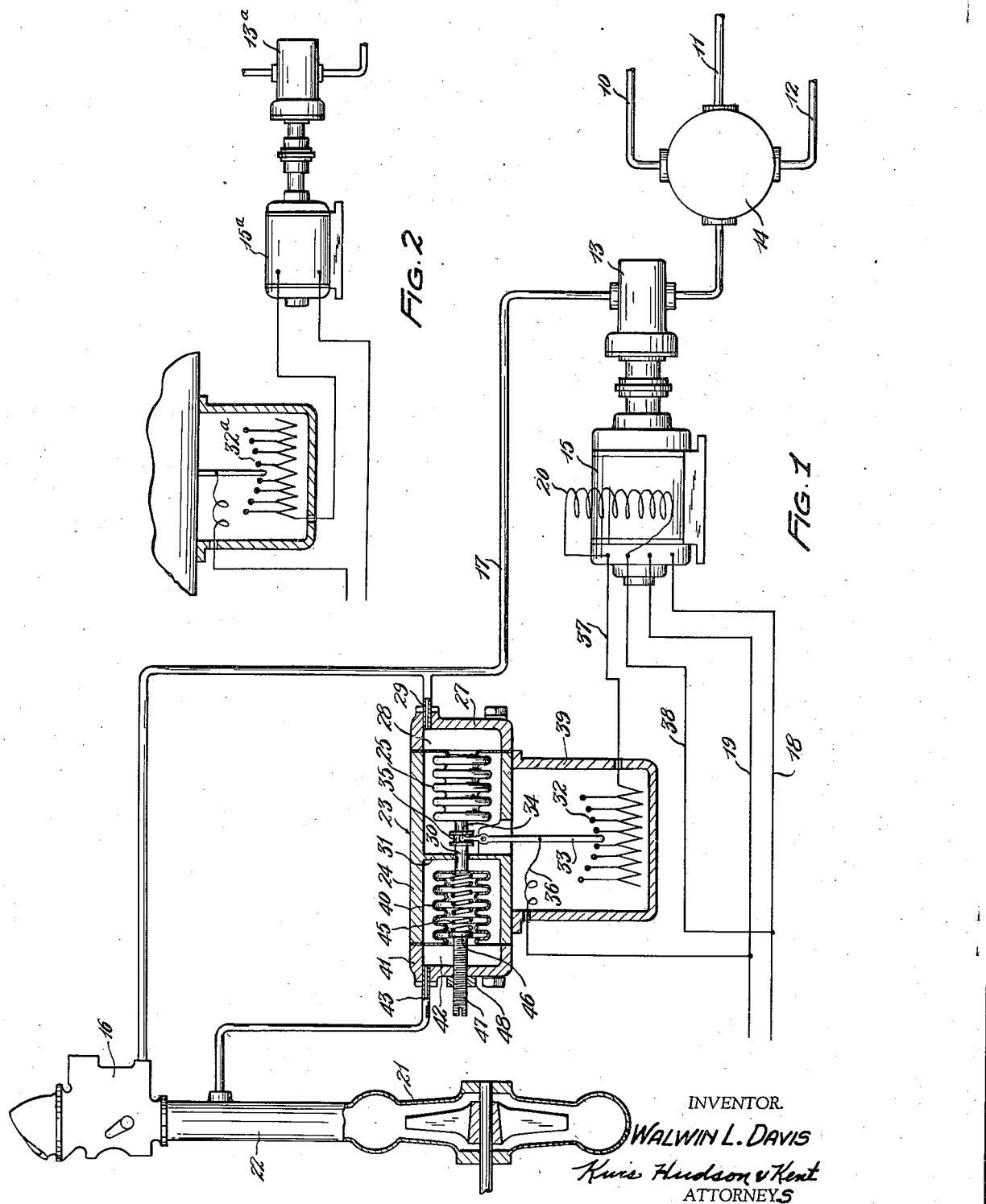

2,348,113

UNITED STATES PATENT OFFICE 2,348,113

FUEL SUPPLY SYSTEM

Walwin L. Davis, Avon, Ohio, assignor to Everett D. McCurdy, Cleveland, Ohio, as trustee Application September 26, 1939, Serial No. 296,644

2 Claims. (Cl. 158—36.3)

This invention relates to fuel systems and more particularly to an improved fuel supply system which is appliable to various uses, but which is especially suitable for supplying fuel to the internal combustion engines of aircraft.

Aircraft manufacturers and users have heretofore been confronted with a difficult problem in providing for a reliable and satisfactory supply of fuel to the engines which will enable their aircraft to fly at the higher altitudes without failure of the fuel system such as has commonly resulted from the occurrence of the condition known as "vapor lock." In endeavoring to provide an adequate supply of fuel at the engine it has been customary to pump fuel in excess of the quantity actually required and to return the excess through a by-pass valve either to the suction side of the pump or to the supply tanks. However, fuel supply systems intended to operate in this manner are not satisfactory because in a system where excess fuel is returned to the suction side of the pump through a by-pass valve the condition of "vapor lock" is augmented rather than diminished and in a system where the excess fuel is returned to the supply tanks a very large amount of auxiliary piping and apparatus is needed.

It is, therefore, an object of the present invention to overcome the above-explained difficulty and disadvantages and to provide an improved fuel supply system which is positive and reliable in affording an uninterrupted supply of fuel at the desired point of use.

Another object of my invention is to provide an improved fuel supply system which is relatively simple and involves only a small amount of apparatus which is of comparatively light weight and can be economically manufactured and installed.

A further object of my invention is to provide an improved fuel supply system having a pump driven by a variable-speed motor and in which the speed of the motor is controlled in response to changes in the pressure of the fuel being delivered.

Still another object of my invention is to provide an improved fuel supply system having a pump for delivering fuel under pressure and a variable-speed drive for the pump, and in which the speed of the pump is controlled in response to variations in the pressure of the fuel being delivered and in response to variations in the pressure of air being delivered for mixing with the fuel.

Yet another object of my invention is to provide an improved control unit by which the speed of a pump having variable-speed driving means can be automatically controlled in accordance with the requirements of the engine or device to which the fuel is being supplied.

Other objects and advantages of my invention will be apparent from the following description and the accompanying drawing in which, Fig. 1 is a view, somewhat diagrammatic in form, showing a fuel supply system embodying my invention; and Fig. 2 is a similar view illustrating a modification of my fuel supply system.

Further reference will now be made to the accompanying drawing for the purpose of describing more in detail the fuel supply systems illustrated therein, but it should be understood, however, that the invention is not limited to the particular structure and arrangements illustrated and described but may be embodied in various other fuel supply systems and arrangements coming within the scope of the appended claims.

In Fig. 1 of the drawing I show a fuel supply system such as might be desirable for use in supplying fuel to the internal combustion engines of airplanes, and particularly for supplying fuel to the engines of airplanes intended to be flown at high altitudes. In this system I show fuel lines 10, 11 and 12 leading from the fuel tanks of an airplane and connected with a fuel supply pump 13, through a suitable control valve or cock 14 which can be set to any one of several different positions for connecting one of the lines 10, 11 and 12 with the pump for supplying fuel thereto from the corresponding tank. The pump 13 may be driven by a motor 15 and operates to deliver fuel under pressure to the carburetor 16 through the delivery line 17. The pump may be of any appropriate type or construction and may be direct-connected or otherwise driven from the motor 15. This pump preferably does not have any by-pass valve or similar passage embodied therein.

The motor 15 for driving the pump 13 may, as here shown, be an electric motor and may be connected with an available power line by the conductors 18 and 19. This motor may be a variable-speed shunt motor having a field coil or winding 20 which can be controlled, as will be explained hereinafter, for varying the speed of the motor and thereby varying the speed at which the pump 13 is driven. The winding 20 may constitute the entire shunt field of the motor 15 or may constitute one or more coils of the shunt field of the motor.

In my improved fuel system I also show a blower or supercharger 21 connected with the carburetor 16 by the air delivery pipe or conduit 22 for supplying air under pressure for mixing with the fuel, as is usual on aircraft intended to be operated at higher altitudes.

For controlling the delivery of fuel to the carburetor 16 by the pump 13, I employ a control unit 23 by which the operation of the pump can be automatically controlled in response to the pressure of the fuel being delivered and also, if desired, in response to the pressure of the air being delivered for mixing with the fuel. This control unit may comprise a suitable housing 24 having therein a fluid-pressure responsive device 25 which is connected with the fuel delivery line 17. This fluid-pressure responsive device 25 may be of any suitable type or construction, and as here shown, may be an expansible chamber device in the form of a bellows.

The bellows 25 may be closed at its inner end and may have its outer end connected with the housing 23 by means of the end section or cover 27 so that the interior of the bellows will be in communication with the fluid delivery line 17 through the chamber 28 and the pipe connection 29. The closed inner end of the bellows 25 may be connected with a rod or stem 30 which may be movably supported and guided in the wall or partition 31 of the housing 24.

With the arrangement just described it will be seen that pressure changes occurring in the fuel delivery line 17 will be transmitted to the bellows 25 and expansion or contraction of the bellows will take place in accordance wth a pressure increase or decrease occurring in the fuel deivery line.

For utilizing this fluid-pressure responsive action of the bellows 25 for controlling the speed of the pump 13, I may provide a circuit control device fur the motor 15 which is adapted to be actuated by the movements of the bellows. This circuit control device may be in the form of a variable resistance, such as the rheostat 32 shown in this instance, and which is connected in series with the shunt winding 20 of the electic motor 15. The movable arm 33 of this rheostat may be pivoted on the housing 24 and may have a forked end 34 which is connected with the rod or stem 30 of the bellows by engagement of the forked end with the grooved collar 35. The energizing circuit for the winding 20 may be traced from the line conductor 19 through the flexible conductor 36, the rheostat arm 33, rheostat resistance 32 and then to one terminal of the winding 20 through the conductor 37. The other terminal of the winding 20 may be connected with the line conductor 18 by the conductor 38. The rheostat or circuit control device 32 may be contained in a housing section 39 into which the arm 33 projects and which may form a part of or be connected with the housing 24.

With the arrangement just described, it will be seen that if the pump 13 is being driven at a speed such as to deliver a greater volume of fuel than is then required at the carburetor 16, the pressure in the delivery line 17 will increase. This pressure will be transmitted to the bellows 25 and will expand or extend the same thereby swinging the arm 33 in a direction to decrease the resistance provided by the rheostat in the energizing circuit for the shunt winding 20. The resulting increase in the field strength of the motor 15 will cause a corresponding decrease in the speed of the motor and of the pump 13. On the other hand, if fuel is admitted to the carburetor 16 at a rate faster than it is being delivered into the line 17 by the pump 13, the pressure in the delivery line will decrease. This decrease in the fuel delivery pressure will permit the bellows 25 to contract or collapse thereby causing swinging of the arm 33 in a direction to increase the resistance in the energizing circuit for the shunt winding 20. The speed of the motor 15 will, accordingly, be increased and the pump 13 will be driven at a faster rate to increase the pressure in the line 17. In this way the pressure in the delivery line 17 can be automatically maintained at a value to insure the delivery of the required supply of fuel at the carburetor 16 and will result in a solid body of fuel being maintained in the delivery line at all times.

To render the operation of the pump 13 also responsive to changes in the pressure of the air being delivered through the conduit 22, I may provide the control unit 23 with a second pressure responsive device or bellows 40. This bellows may be closed at its inner end and may have its open outer end connected with the housing 24 by means of the housing section or cover 41. The open outer end of the bellows 40 is in communication with the air delivery conduit 22 through the chamber 42 of the housing section 41 and the pipe connection 43. The closed inner end of the bellows 40 may be connected with the rod or stem 30 and thereby connected with the closed inner end of the bellows 25.

When the bellows 40 is provided in my fuel control system in the arrangement just described, it will be seen that this bellows will be responsive to changes occurring in the pressure of the air being delivered through the conduit 22 for mixing with the fuel and that the bellows 40 will oppose the bellows 25. Thus when air is being supplied in increased volume by the blower 21 the pressure in the conduit 22 will increase and this pressure being transmitted to the bellows 40 will expand or extend the latter. This movement of the bellows 40 will oppose any expansive movement of the bellows 25 tending to decrease the speed of the pump 13. The arm 33 of the circuit control device will then be actuated by the resultant movement of the two bellows 25 and 40.

The arrangement just described may be a very desirable one because if operating conditions are such that the delivery of a large volume of air through the conduit 22 is required, the pressure in this conduit may increase, and increased pressure in the fuel delivery line 17 will then be necessary if the required amount of fuel is to be supplied to the carburetor 16. If the operation of the pump 13 were controlled only in response to pressure changes in the delivery line 17, such increased pressure in this line would then tend to bring about a decrease in the supply of fuel just at the time when an increased pressure in the fuel line would be desirable. With the arrangement just described, however, the bellows 40 responding to the increased pressure in the conduit 22 would oppose the bellows 25 and the pressure in the fuel delivery line 17 would be maintained or increased, as the situation might require.

It may be desirable to provide means for adjusting or calibrating the control unit 23 and although this may be done in various ways, I have shown one satisfactory way of accomplishing this. In the arrangement illustrated, I may provide a compression spring 45 in the bellows 40 with its opposite ends seating, respectively, against the inner end of this bellows and the head 46 of an adjusting screw 47. This screw may be mounted in the housing section 41 so that by inward or outward adjustment thereof, the compression of the spring 45 can be varied. A lock nut 48 on the screw 47 serves to lock the same at the desired setting or adjustment.

Instead of controlling the speed of the motor 15 by varying the ampere-turns of the shunt coil or winding 20 thereof, as above explained, I may provide a circuit-control device such as the rheostat 32a in the armature circuit of the pump driving motor 15a, as shown in Fig. 2. In this modified arrangement the motor 15a may be an electric motor of any desired or suitable characteristics and drives the pump 13a in the same manner and for the same purpose as above explained for the pump 13.

From the foregoing description and the accompanying drawing, it will now be readily understood that I have provided an improved fuel supply system in which the speed of the pump driving means will be automatically and substantially instantaneously varied to meet the fuel requirements of an internal combustion engine or other device with which my system may be used. It will be seen furthermore, that with the novel control unit provided in this system, the speed of the pump will be controlled in response to changes in pressure in the fuel delivery line and also, if desired, in response to changes in the pressure of air being delivered for mixing with the fuel. It will be seen further that in the operation of this system an adequate supply of fuel at the proper pressure will always be maintained in the fuel delivery line and the undesirable effects heretofore causd by "vapor lock" will be entirely eliminated.

While I have illustrated and described my fuel supply system in a more or less detailed manner, it will be understood, of course, that the invention is not to be limited to the specific details and arrangements herein disclosed, but includes such changes and modifications as do not constitute a departure from the spirit of the invention and the scope of the appended claims.

Having thus described my invention, I claim:

1. In a system for supplying fuel to an internal combustion engine having a carburetor, a pump adapted to deliver fuel to the carburetor at a pressure which is dependent on the speed at which the pump is driven, means for delivering air to the carburetor under pressure for mixing with the fuel, an electric motor operable to drive said pump and having a shunt field coil, a variable resistance in circuit with said shunt field coil, a pair of devices connected to oppose each other and to be responsive respectively to changes in the pressure of the fuel and air being delivered, and means responsive to the resultant movement of said devices for actuating said variable resistance.

2. In a system for supplying fuel to an internal combustion engine having a carburetor, a pump having its discharge connected with said carburetor for delivering fuel thereto at a pressure which is dependent on the speed at which the pump is driven, a variable speed electric motor connected with said pump for driving the same, means for delivering air to said carburetor under pressure for mixing with the fuel, a motor energizing circuit having therein a resistance which is variable for varying the speed of the motor, an expansible device connected with the air delivery means so as to be responsive to an increase or decrease in the pressure of the air being delivered, an expansible device connected with the pump discharge so as to be responsive to an increase or decrease in the pressure of the fuel being delivered, said expansible devices being arranged to oppose each other, and means actuated by the resultant movement of said expansible devices for varying said resistance.

WALWIN L. DAVIS.